Oct. 13, 1931.  M. H. HILL  1,827,007
INDEXING MECHANISM
Filed Dec. 4, 1929  2 Sheets-Sheet 1
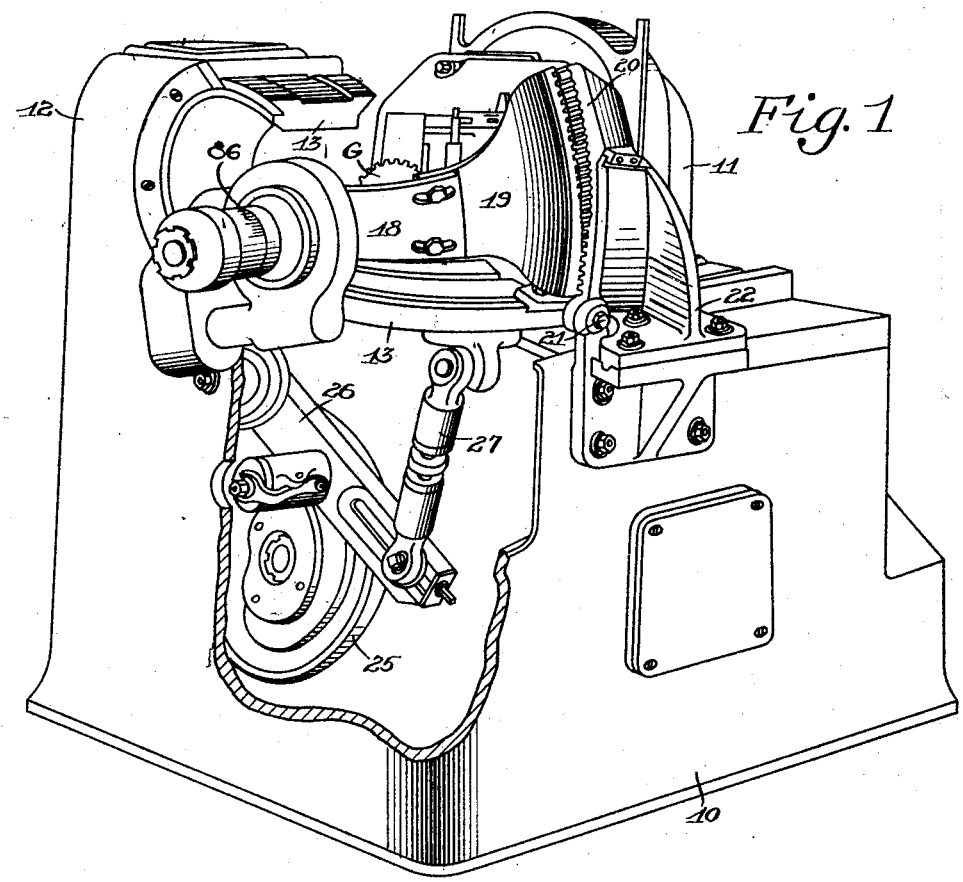
Fig. 1
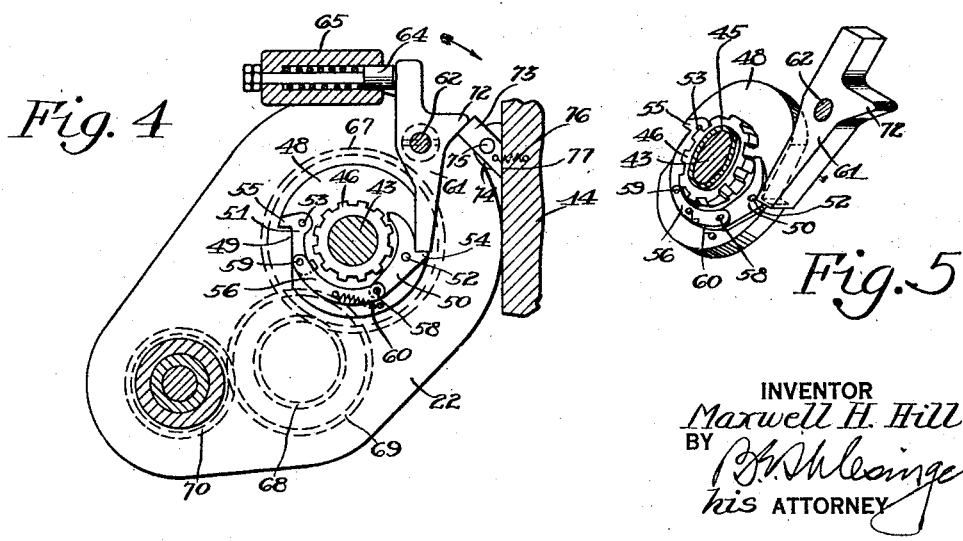
Fig. 4
Fig. 5
INVENTOR
Maxwell H. Hill
BY
his ATTORNEY Oct. 13, 1931.   M. H. HILL   1,827,007
INDEXING MECHANISM
Filed Dec. 4, 1929   2 Sheets-Sheet 2

INVENTOR
Maxwell H. Hill
BY
his ATTORNEY

Patented Oct. 13, 1931

1,827,007

UNITED STATES PATENT OFFICE

MAXWELL H. HILL, OF ROCHESTER, NEW YORK, ASSIGNOR TO GLEASON WORKS, OF ROCHESTER, NEW YORK, A CORPORATION OF NEW YORK

INDEXING MECHANISM

Application filed December 4, 1929. Serial No. 411,566.

The present invention relates to indexing mechanism for gear cutting machines and particularly to indexing mechanism for gear generating machines in which the generating motion is produced by oscillation of a cradle on which the tool or blank is mounted and by roll of a segment which is connected to the work spindle and meshes with a segment having a fixed relation to the tool.

The purpose of this invention is to provide an indexing mechanism which will be simple in operation and universal in character, that is, capable of indexing for gears of different tooth numbers, and which is operated by the roll of the machine itself.

A preferred embodiment of the invention is illustrated in the accompanying drawings, in which:

Figure 1 is a perspective view, with parts broken away, of a bevel gear generating machine on which the indexing mechanism of the present invention is employed;

Figure 4 is a section on an enlarged scale on the line 4—4 of Figure 2 looking in the direction of the arrows; and Figure 5 is a perspective view of certain details of the indexing mechanism.

Figure 2:
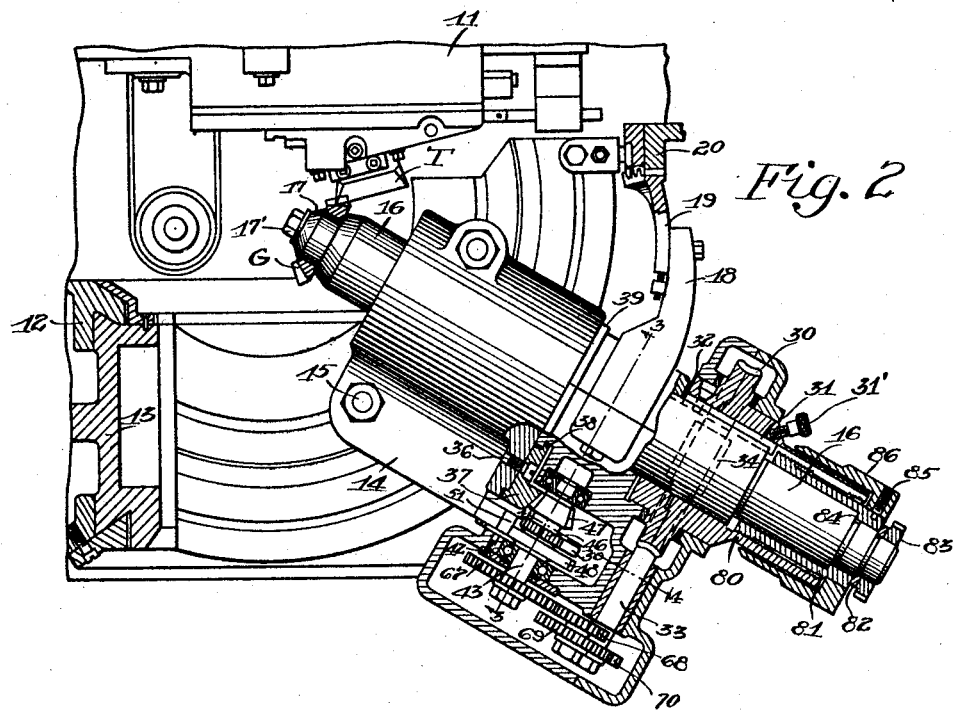
Figure 2 is a fragmentary plan view of this machine, parts being shown in section.
Figure 3:
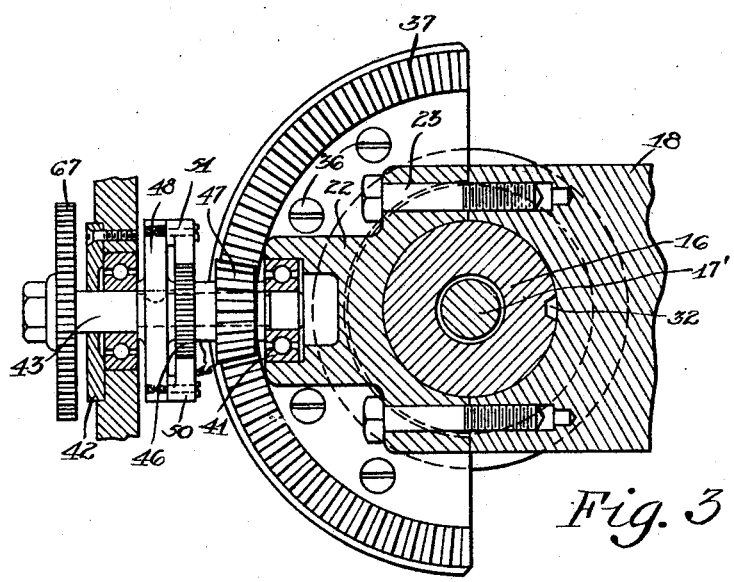
Figure 3 is a section on the line 3—3 of Figure 2 looking in the direction of the arrows, the scale being slightly enlarged.

Where quantity production is desired, it is usual to generate the gears on a machine of the "segment" type. In such machines, as already described, the generating motion is produced by oscillation of the cradle on which the tool or blank is mounted and by roll of the gear segment which is connected to the work spindle on a relatively stationary gear segment (usually a crown gear segment) which has a fixed relation to the tool. In such machines, it is customary to employ an indexing mechanism of the notched plate type and, to avoid a complicated drive to the work spindle, it is the practice to design such machines so that the generating roll itself is used to actuate the indexing mechanism. In an indexing mechanism of the notched plate type, however, it is required that the index plate have the same number of notches as there are teeth to be cut in the blank. This means that the index plate must be changed whenever it is desired to cut gears of a different tooth number on the generating machine. These plates must be ground with great care to eliminate inaccuracies in the indexing of the gear itself and they are, consequently, expensive.

With the present invention, the index plates are eliminated and an indexing mechanism of a more universal character is provided. In the preferred embodiment, a worm and worm wheel type indexing mechanism is employed. The worm and wheel can be used to index gears of any tooth number within the range of the machine and different tooth numbers can be obtained by simply changing the index change gears which are incorporated in the drive to the index worm. These change gears are comparatively inexpensive and can be changed in a few moments. Through a novel construction, the worm and worm wheel type indexing mechanism is actuated in the present invention by the roll of the machine. Worm and worm wheel indexing mechanisms have heretofore been employed in practise only on machines of the "geared roll" type (machines where the generating roll is obtained by a geared connection between the work spindle and cradle) and then only where the cutting tool was mounted on the cradle. The present invention because of the comparative simplicity of the drive employed, permits of using this universal type of indexing mechanism either in a machine in which the tool is mounted on the cradle or in a machine in which the work is mounted on the cradle and permits, in addition, of employing an indexing mechanism of the universal type on a manufacturing machine of the "segment roll" type.

The machine illustrated in the drawings is a two tool straight tooth bevel gear generator of the type described in the pending application of Eyvind Finsen, Serial No. 312,173, filed October 12, 1928, and reference may be had to that application for a description of the parts not specifically described herein.

10 indicates the base or frame of the machine. Upon this base or frame is slidably mounted the tool carrier 11 which is movable on the bed or frame 10 for the purpose of feeding the tool into engagement with the blank to cut the teeth and of withdrawing the tool periodically from engagement with the blank to permit indexing the blank. One of the tools is shown at T.

The bed or frame 10 is formed at one end with an upright portion 12 which is provided with guide-ways for the oscillating cradle 13. Mounted on the cradle 13 for angular adjustment thereon is the work head 14. The work head 14 can be adjusted by hand to position the blank in the correct angular relation to the tool and can be secured in any adjusted position by means of the bolts 15. The work spindle 16 is journaled in the work head 14. The gear blank G to be cut is secured to the work spindle 16 in any suitable manner as by the plate 17 and draw-bolt 17'.

18 designates a segment supporting arm on which is adjustably mounted the gear segment 19. This segment 19 meshes with a crown gear segment 20 that is pivotally mounted at 21 on a bracket 22 which is secured in fixed position on the machine. The segment arm 18 terminates in a semi-circular portion which fits about the work spindle 16 and the segment arm is secured on the work spindle by the member 22, which is also formed with a semi-circular portion engaging the work spindle and by the bolts 23 which secure the member 22 and the arm 18 together.

The cradle is oscillated from a cam 25 through a cam lever 26 and the turn buckle member 27. The lever 26 is pivotally connected at one end to the frame of the machine and at its other end to the lower end of the turn-buckle 27. Intermediate its ends, the lever 26 carries the roller which engages the cam 25. The turn-buckle is pivotally connected at its upper end to the cradle. This construction is described in the application above mentioned and forms no part of the present invention.

It will be seen that as the cradle oscillates under actuation of the cam 25, the segment 19 will roll on the crown gear segment 20 and if the segment 19 is connected to the work spindle that a rotary motion will be imparted to the work spindle. The two motions, namely, oscillation of the cradle and rotation of the work spindle are required to generate the tooth profiles.

30 designates the index worm wheel. This worm wheel is secured to the work spindle 16 by a key 31 which engages in the elongated T-slot 32 formed in the work spindle and which is bound into close engagement with the keyway by the thumb-screw 31'. Journaled in the casting 22 is a worm shaft 33 to which is secured the index worm 34 which meshes with the index worm wheel 30. A worm and worm wheel have a self-locking action and it is clear, therefore, that as long as the worm shaft 33 is stationary the work spindle will move with the gear segment 19. This is required during cutting, but to index the work spindle after a tooth has been generated, it is necessary to rotate the work spindle relative to the casting 22 and the segment 19.

Secured to the work head 14, as by means of the screws 36 is a bevel gear segment 37. This segment 37 is coaxial with the work spindle 16. The segment 37 has a flange or gib portion 38 which engages a collar 39 formed on the casting 22 to hold that casting and the segment arm 18 against axial movement on the work spindle 16.

Journaled in anti-friction bearings 41 and 42 in the casting 22 is a shaft 43. Rotatably mounted on this shaft is a sleeve 45 to which is secured, or with which is formed integral, the ratchet wheel 46 and the bevel pinion 47. The bevel pinion 47 meshes with the bevel gear segment 37. Secured to the shaft 43 or formed integral therewith is a stop-plate 48. This stop plate 48 is formed at diametrically opposed points on its periphery with notches 49. A pair of pawls 50 and 51 are pivotally mounted at 52 and 53, respectively, on this stop-plate 48. These pawls are adapted to engage the ratchet wheel 46 to transmit rotation from the ratchet wheel to the stop-plate 48 and the shaft 43.

The pawl 50 is formed with a lug 54 and the pawl 51 with a tail-piece 55. The pawls are connected to move together by means of a link 56 which is pivoted to the pawl 50 at 58 and to the pawl 51 at 59. A coil spring 60 which is connected at one end to the link 56 and at its opposite end to the stop plate 48 serves to urge the two pawls constantly into engagement with the ratchet wheel 46.

The pawls are held out of engagement with the ratchet wheel by a dog 61 which is pivotally mounted at 62 on the casting 22. This dog 61 is so formed as to engage alternately with the notches 49 of the stop-plate and with the lug 54 of the pawl 50 or the tail-piece 55 of the pawl 51. The dog 61 is constantly urged into position to hold the pawls disengaged from the ratchet wheel by a spring-pressed plunger 64 which is housed in the lug 65 formed integral with the casting 22, and which engages the outer end of the dog 61.

The shaft 43 is operatively connected with the index worm shaft 33 by the index change gears 67, 68, 69 and 70.

In the operation of the machine, as the tool is fed into depth, the generating roll is imparted to the blank through oscillation of the cradle 13 which causes segment 19 to roll on the crown gear segment 20 and impart a rotary motion to the work spindle. At this time, of course, the work spindle 16 is connected to the segment 19. This connection is through the arm 18, the casting 22, the worm shaft 33 and worm 34, and the worm wheel 30. The rolling motion of the segment 19 on the crown gear segment 20 causes the bevel gear 47 to roll on the bevel gear segment 37 but the pawls 50 and 51 are held out of engagement with the rotating ratchet wheel 46 by means of the lock-dog 61. Hence, no motion is imparted to the stop plate 48 and the shaft 43 so that the index worm shaft 33 remains stationary. Because of the self-locking feature of the worm and worm wheel drive 34—30, then, the work spindle 16 moves with the gear segment 19 during cutting.

As the casting 22 rotates under actuation of the segment 19, the nose 72 formed on the locking dog 61 is brought into engagement with a trip member 73. This trip member 73 is pivotally mounted on an ear 74 which is formed integral with the work head 14. This trip member 73 is free to move about its pivot 75 in one direction against the resistance of the spring 76 but is held against movement in the opposite direction by engagement of its inner end face 77 with the adjacent face of the work head 14.

As the casting 22 rotates in the direction shown by the arrow in Figure 4, then, the nose 72 of the dog 71 engages the trip member 73. This trip member cannot swing about its pivot 75 because its inner end face 77 is in engagement with the work head 14. Hence, the dog 61 is swung about its pivot 62 against the resistance of the spring plunger 64 and the dog 61 is disengaged from the stop plate 48 and whichever of the pawls 50 or 51 with which it has been in engagement. Immediately the pawls engage the ratchet wheel 46 and the rotation of the ratchet wheel is transmitted through the stop plate 48, the shaft 43, the index change gears 67, 68, 69 and 70, the worm shaft 33 and the index worm 34 to the index worm wheel 30 to rotate the work spindle 16 relative to the casting 22 and segment arm 18 to index the gear blank G. As the stop plate 48 rotates, the locking dog 61 rides on its periphery. The stop plate makes half a revolution and then the stop dog drops into engagement with a notch 49 of the stop plate at the same time engaging the adjacent lug 54 of the pawl 50 or tail-piece 55 of the pawl 51, as the case may be, disengaging the pawls from the ratchet wheel 46 and stopping the rotation of the index worm and wheel. This completes the indexing cycle. The segment 19 and work spindle 16 will now again move together. It is to be noted that during the indexing operation, the tool head is withdrawn from engagement with the blank through operation of the feed cam.

After the indexing operation has been completed and the stop-plate locked up again, the cradle will be reversed under actuation of the cam 25 and the dog 61 which has ridden over the trip 73 during the indexing, will be brought back into engagement with the trip. This time, however, the dog 61 will rock the trip 73 out of the way against the resistance of the spring 77 and will not be disengaged from the stop plate or the pawls. The work spindle is indexed, then, on roll in one direction only.

It is to be noted that the provision of the stop-plate 48 is a precautional feature and that because of this stop-plate, it is not necessary to depend solely upon the self-locking characteristic of a worm and worm wheel drive to insure that the work spindle will not rotate relative to the segment 19 during cutting. The casting 22 may be so formed as to provide a guard, as shown, about the worm wheel 30. The worm wheel 30 may have formed integral with it a sleeve 80 which is internally threaded as shown. A sleeve 81 which surrounds the outer end of the work spindle 16 is adapted to thread into the sleeve 80. The outer end face of this sleeve 81 is adapted to engage a washer or disc 82 which is held on the spindle by the nut 83. The sleeve 81 is formed internally with a shoulder which engages a shoulder 84 turned on the periphery of the work spindle 16. Secured to the sleeve 81, as by means of the set-screw 85 is a ferrule 86 which surrounds the sleeve 80. This ferrule 86 may be graduated, as shown, to read against an index mark scribed on the periphery of the sleeve 80. It will be seen that by rotating the ferrule 86 the work spindle may be adjusted in or out axially to adjust the apex position of the gear blank to be cut.

While the invention has been described in connection with a particular embodiment, it will be understood that it is capable of further modifications and of use in connection with various types of gear cutting machines. It will be understood, then, that this application is intended to cover any variations, uses, or adaptations of the invention, following, in general, the principles of the invention and including such departures from the present disclosure as come within known or customary practise in the gear art and as may be applied to the essential features hereinbefore set forth and as fall within the limits of the invention or the scope of the appended claims.

Having thus described my invention, what I claim is:

1. In a machine for producing gears, tool mechanism, a work support, a sleeve oscilatably mounted on the work support, a work spindle journaled in said sleeve, means for oscillating said sleeve, gearing connecting the sleeve with the work spindle, means for locking said gearing against rotation during cutting, and means whereby the oscillatory motion of the sleeve operates to rotate said gearing periodically to index the work spindle.

2. In a gear cutting machine, the combination with a tool mechanism, a support, and a pair of members rotatably mounted on said support, one of said members being arranged to carry a gear blank, and means for rotating one of said members, of gearing for connecting said members and normally stationary to cause said members to rotate together, and means for periodically connecting one of said members to said support to actuate said gearing to index the work carrying member.

3. In a machine for producing gears, the combination of a tool mechanism, a support, a pair of members rotatably mounted on said support, one of said members being arranged to carry a gear blank, a worm and worm wheel connecting said members to cause them to rotate together when said worm is stationary, means for rotating one of said members and means for periodically connecting said worm to said support to effect, by the resulting relative movement between said members, rotation of the worm to index the blank carrying member.

4. In a machine for producing gears, the combination of a tool mechanism, a support, a pair of members rotatably mounted on said support, one of said members being arranged to carry a gear blank, a worm and worm wheel connecting said members to cause them to rotate together when the worm is stationary, means for rotating one of said members and means whereby the rotation of said member periodically effects rotation of the worm to index the blank carrying member.

5. In a gear cutting machine, the combination with a sleeve and means for imparting an oscillatory motion thereto, of a work spindle rotatable within the sleeve, a worm and worm wheel connecting the work spindle and sleeve and adapted to oscillate with the latter, means operated by oscillation of said sleeve for rotating said worm, and means adapted to connect said last named means to said worm to actuate the same at a predetermined point in the oscillation of said sleeve to index the work spindle.

6. In a gear cutting machine, the combination with a sleeve and means for imparting an oscillating motion thereto, of a work spindle rotatable in said sleeve, a member driven continuously by said sleeve during its oscillation, means normally preventing connection of said member with the work spindle, and means operatng to effect said connection at a predetermined point in the oscillation of said sleeve.

7. In a machine for producing gears, a sleeve, means for imparting an oscillating motion to said sleeve, a work spindle rotatable in said sleeve, a worm and worm wheel connecting the work spindle and sleeve to cause them to oscillate together, a member driven continuously by the sleeve in its oscillation, means normally preventing connection of said member with said worm, and means operating to effect said connection at a predetermined point in the oscillation of said sleeve to index said work spindle.

8. In a machine for producing gears, a tool mechanism, a sleeve, a work spindle journaled in said sleeve, means for oscillating said sleeve, a worm and worm wheel connecting said sleeve and work spindle and adapted to be actuated to index said work spindle relative to said sleeve, gearing for rotating said worm and wheel, means whereby oscillation of said sleeve operates said gearing, means preventing connection of said gearing with said worm during cutting, and a member adapted to be engaged by said last named means at a predetermined point in the oscillatory movement of said sleeve to trip said sleeve and permit connection of said gearing with said worm.

9. In a machine for producing gears, a tool mechanism, a sleeve, a work spindle rotatable in said sleeve, means for oscillating said sleeve, a worm and worm wheel connecting the sleeve and spindle to oscillate together, a ratchet wheel, means for rotating the ratchet wheel on oscillation of said sleeve, a pawl adapted to cooperate with the ratchet wheel to connect said ratchet wheel to said worm to rotate together, means holding said pawl out of engagement with the ratchet wheel, and means for releasing said pawl at a predetermined point in the oscillation of said sleeve to permit the same to engage said ratchet wheel.

10. In a machine for producing gears, a tool mechanism, a sleeve, a work spindle rotatably mounted in said sleeve, means for oscillating said sleeve, a gear secured to the work spindle, gearing operable on oscillation of said sleeve to impart rotation to said gear to index the work spindle, said gearing being disconnected from said gear during cutting and means whereby the oscillation of said sleeve acts periodically to connect said gearing to said gear.

11. In a gear generating machine, a tool mechanism, a blank carrier, a blank spindle rotatably mounted therein, means for rolling the blank carrier bodily to generate the tooth profiles, gearing operable to rotate the blank spindle to index the same, a rotary member, means operable on oscillation of said blank carrier for rotating said member, means preventing connection of said member with said gearing during cutting, and means whereby said rolling movement operates automatically to release said last named means at predetermined intervals and simultaneously connects said rotary member to said train of gearing to index the blank.

12. In a machine for producing gears, a tool mechanism, and a work spindle, an oscillatory cradle upon which one of said parts is mounted, a gear segment having a fixed relation to the tool mechanism, a second gear segment adapted to mesh with the first segment, a worm and wheel connecting the second segment to the work spindle adapted to remain stationary during cutting so that the work spindle will move with the second segment, means for oscillating the cradle, and means whereby the oscillation of the cradle actuates said worm and wheel to rotate the work spindle at a predetermined point in the roll of the cradle to index the work spindle.

13. In a machine for producing gears, a tool mechanism, and a work spindle, an oscillatory cradle upon which one of said parts is mounted, a gear segment having a fixed relation to the tool mechanism, a second gear segment adapted to mesh with the first, means adapted to connect the segment to the work spindle including a gear mounted on the work spindle, means whereby the oscillation of the cradle is adapted to rotate said gear to index the work spindle, means preventing operative connection of said last named means to said gear during cutting, and means whereby the motion of the cradle operates to trip said last named means at a predetermined point in the oscillation of the cradle to permit indexing.

14. In a machine for producing gears, a tool support and a work support, a tool mechanism mounted on the tool support, a work spindle rotatably mounted on the work support, an oscillatory cradle upon which one of said supports is mounted, a gear segment having a fixed relation to the tool mechanism, a second gear segment adapted to mesh with the first segment, a gear mounted on the work spindle for connecting the work spindle to the second segment so that the two move together during cutting, and means for periodically connecting said gear to its support to effect relative rotational movement between the spindle and the second segment to index the work spindle.

15. In a machine for producing gears, a tool support, a tool mechanism mounted on the tool support, a work support, a work spindle rotatably mounted on the work support, an oscillatory cradle upon which one of said supports is mounted, a gear segment having a fixed relation to the tool mechanism, a second gear segment adapted to mesh with the first, a worm and worm wheel connecting the second segment with the work spindle to rotate together, means whereby the relative motion between the second segment and the work support is adapted to effect rotation of the work spindle relative to the second segment for indexing, locking means adapted to prevent the last named motion during cutting, and means for tripping said locking means at a predetermined point in the movement of the cradle.

16. In a machine for producing gears, a tool support, a tool mechanism mounted on the tool support, a work support, a work spindle rotatably mounted on the work support, an oscillatory cradle upon which one of said supports is mounted, a gear segment having a fixed relation to the tool mechanism, a second gear segment adapted to mesh with the first, a worm and worm wheel connecting the second segment with the work spindle to rotate together, means for oscillating the cradle to produce a relative rolling motion between the tool mechanism and work spindle, and instrumentalities whereby the rolling motion acts automatically to connect the worm to the work support periodically to rotate the same for indexing the work spindle.

17. In a machine for producing gears, a tool support, a tool mechanism mounted on the tool support, a work support, a work spindle rotatably mounted on the work support, and oscillatory cradle upon which one of supports is mounted, a gear segment having a fixed relation to the tool mechanism, a second gear segment adapted to mesh with the first, a worm wheel secured to the work spindle, a worm carried by the second segment and meshing with said worm wheel, a third segment carried by the work support, a gear meshing with the third segment and adapted to be rotated on relative movement between the second segment and work support, means adapted to connect said gear to the worm to drive the same, locking means preventing said connection during cutting, and means for tripping said locking means at a predetermined point in the roll of the cradle.

18. In a machine for producing gears, a tool mechanism and a work support, a reciprocable carrier upon which one of said parts is mounted, a sleeve oscillatably mounted in the work support, a work spindle journaled in said sleeve, a gear segment having a fixed relation to the tool mechanism, a gear segment secured to said sleeve and meshing with the first segment, gearing connecting the sleeve with the work spindle, means for locking said gearing against rotation during cutting, means for periodically releasing said locking means, and means whereby reciprocating motion of said carrier operates to rotate said gearing when unlocked to index the work spindle.

19. In a machine for producing gears, a tool mechanism, a work support, a pair of members rotatably mounted on the work support, one of said members being arranged to carry a gear blank, means for oscillating one of said members, a stationary gear, gearing carried by the oscillating member meshing with said stationary gear and rotated thereby as the oscillatory member oscillates, locking means for securing said members to rotate together during cutting, and means for periodically releasing said locking means and connecting said gearing to the other members to produce relative movement between said members to index the work carrying member.

MAXWELL H. HILL.